United States Patent [19]

Mohn et al.

[11] Patent Number: 4,698,154
[45] Date of Patent: Oct. 6, 1987

[54] APPARATUS FOR FILTERING AND SEPARATING FLOWING MEDIA

[76] Inventors: Jürgen Mohn, Rahewinkel 21, 2000 Hamburg 74; Wilhelm Heine, Knickberg 1b, 2100 Hamburg 90, both of Fed. Rep. of Germany

[21] Appl. No.: 890,790

[22] Filed: Jul. 23, 1986

Related U.S. Application Data

[63] Continuation of Ser. No. 634,875, Jul. 26, 1984, abandoned.

[30] Foreign Application Priority Data

Jul. 29, 1983 [DE] Fed. Rep. of Germany ....... 3327431

[51] Int. Cl.⁴ ............................................ B01D 13/00
[52] U.S. Cl. .................................... 210/232; 210/450; 210/321.75
[58] Field of Search .................... 210/321.1, 450, 232, 210/347, 433.2, 486

[56] References Cited

U.S. PATENT DOCUMENTS

| | | | |
|---|---|---|---|
| 3,847,818 | 11/1974 | Madsen et al. | 210/321.1 |
| 3,882,024 | 5/1975 | Holmes et al. | 210/321.1 |
| 4,071,444 | 1/1978 | Ash et al. | 210/232 |
| 4,115,274 | 9/1978 | Böddeker et al. | 210/321.1 |
| 4,228,014 | 10/1980 | Timm et al. | 210/433.2 |
| 4,340,475 | 7/1982 | Kraus et al. | 210/433.2 |
| 4,346,004 | 8/1982 | Foucras et al. | 210/321.1 |

Primary Examiner—S. Leon Bashore
Assistant Examiner—K. M. Hastings
Attorney, Agent, or Firm—Becker & Becker, Inc.

[57] ABSTRACT

A modular unit as a filtering apparatus for a membrane separation process, especially for treating water by reverse osmosis, includes a pipe which is open at both ends. A stack of membranes adapted to the inner diameter of the pipe can be inserted into the pipe. The stack of filter elements, which includes guide plates, carrier plates, and membranes, is clamped together by a central clamping bolt which passes through the filter element stack between two fixed pressure plates. Located at the peripheries of the pressure plates are inclined circumferential grooves in which are disposed sealing rings which, when excess pressure exists in the interior of the housing, are urged radially and axially outwardly, and thus effect a good seal between the inner wall of the pipe and the peripheries of the pressure plates.

3 Claims, 13 Drawing Figures

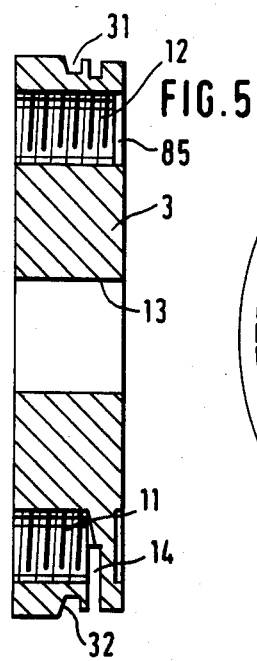
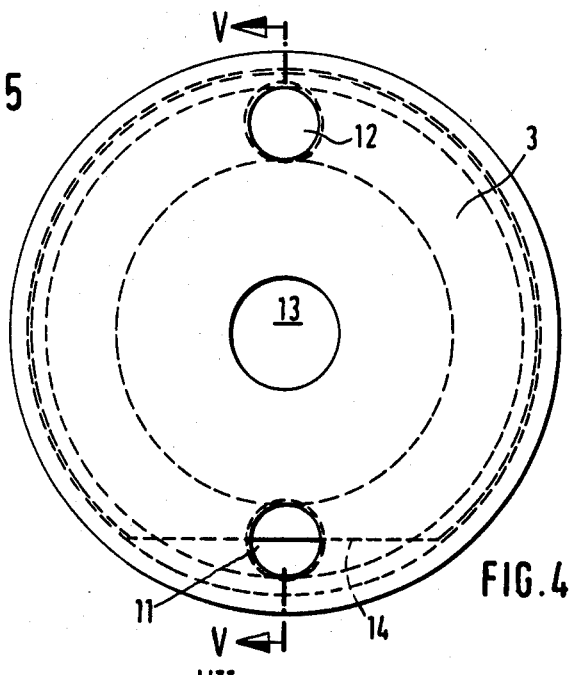
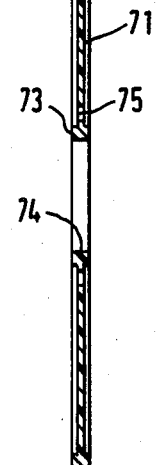
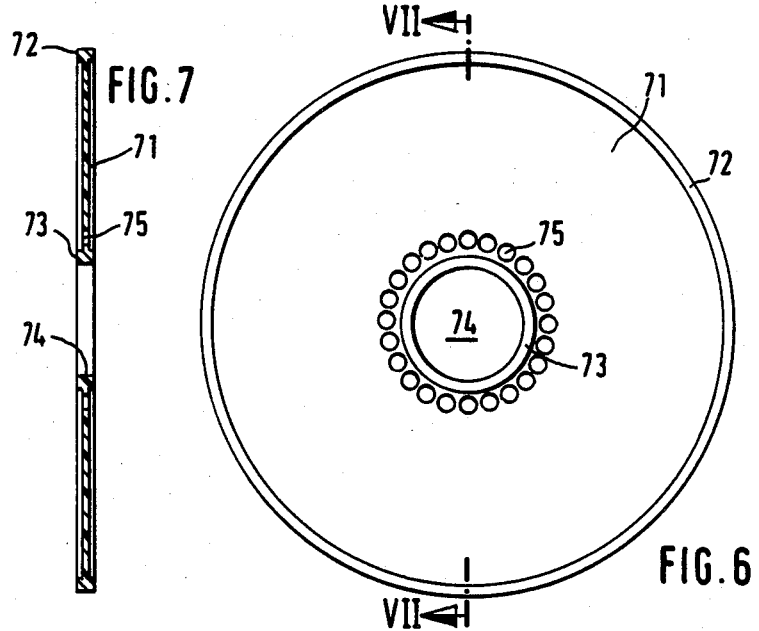

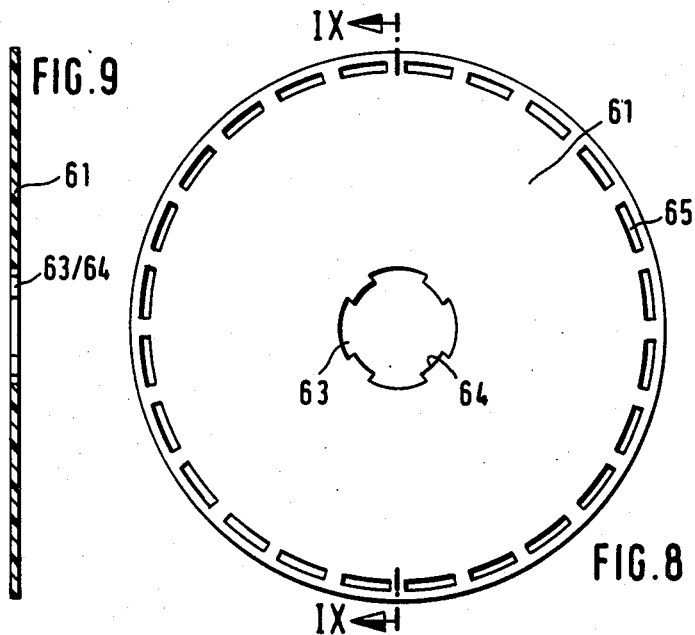
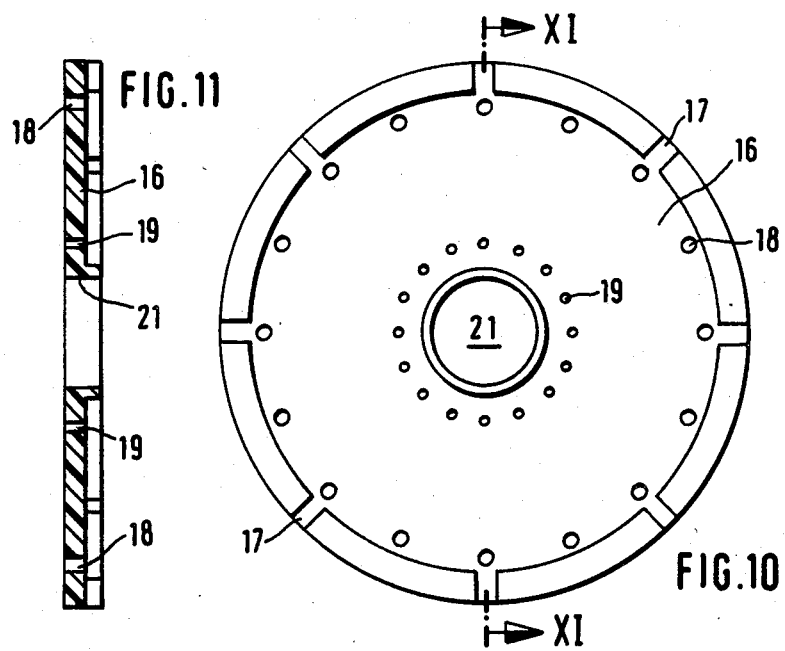

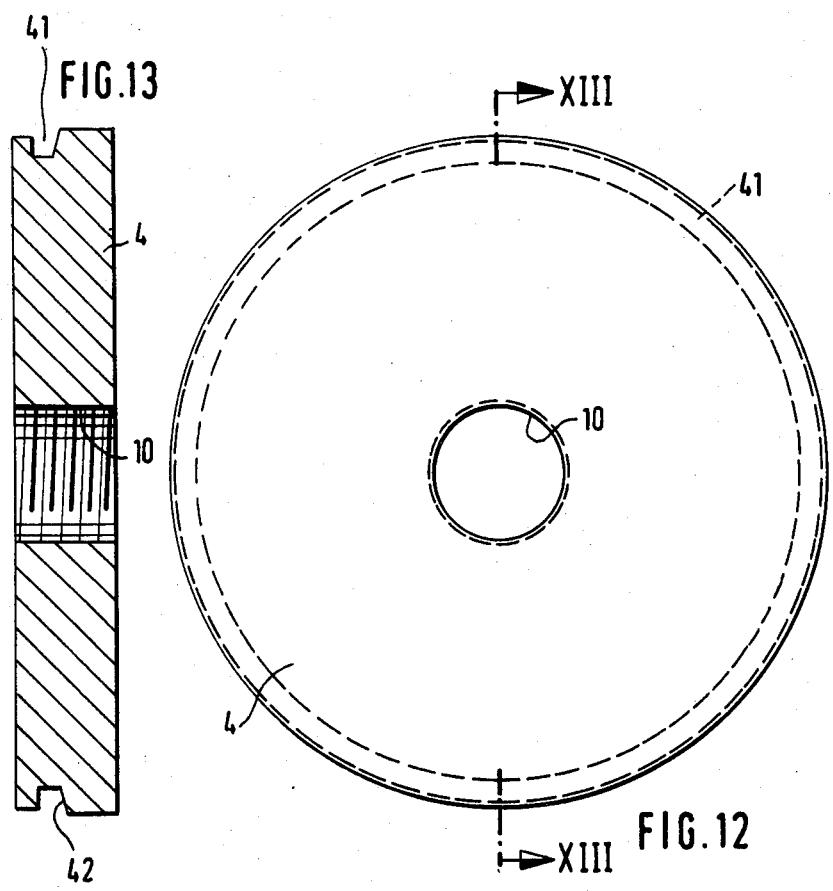

APPARATUS FOR FILTERING AND SEPARATING FLOWING MEDIA

This application is a continuation of application Ser. No. 634,875, filed July 26, 1984, now abandoned.

BACKGROUND OF THE INVENTION

The present invention relates to an apparatus for filtering and separating flowing media, especially for salt water conversion and water purification via reverse osmosis and ultra-filtration. The apparatus includes a plurality of circular disk-like filter elements which are connected in series and are stacked against one another. Each filter element comprises a plate-like carrier plate, a dish-like guide plate, and a membrane which is disposed between the carrier plate and the guide plate and is covered with a filter sheet or filtering layer. Wheel-like pressure plates are provided at the ends of the stack of filter elements. These pressure plates clamp together the stack of filter elements with a bolt that passes through the central holes of the filter elements.

DESCRIPTION OF PRIOR ART

Filter apparatus arrangements of the aforementioned general type are known, for example, from U.S. Pat. No. 3,847,818 Madsen et al dated Nov. 12, 1984. So that such filter apparatus can be economically operated, the filter elements must be accommodated in a housing in such a way that these elements are easily accessible and can be rapidly assembled and disassembled. In the ideal case, with the exception of the connections for the flowing media, only a single connection need be loosened in order to make accessible the entire stack of filter elements. However, there is also necessary for the economical operation that such a filter apparatus is operable at relatively high pressure. Critical sealing problems result if the overall filter apparatus is held together only by a single clamping bolt. If, in order to reduce the sealing difficulties, a pipe-like housing is used which is closed on one side, the housing becomes very expensive. This is true regardless of whether the closed end of the housing is integrally manufactured in the shape of a dome, or whether a cover is mounted at the closed end on an annular flange.

An object of the present invention therefore is to provide an improved filter apparatus of the aforementioned general type which, at only slight expense, provides the possibility of replacing the stacked filter elements without thereby giving rise to any kind of sealing problem.

BRIEF DESCRIPTION OF THE DRAWINGS

This object, and other objects and advantages of the present invention, will appear more clearly from the following specification in conjunction with the accompanying drawings, in which:

FIG. 4 is an end view of the front pressure plate;

FIG. 5 is a cross-sectional view taken along the line V—V in FIG. 4;

FIG. 6 is an end view of a guide plate of a filter element;

FIG. 7 is a cross-sectional view taken along the line VII—VII in FIG. 6;

FIG. 8 is an end view of a membrane carrier plate;

FIG. 9 is a cross-sectional view taken along the line IX—IX in FIG. 8;

FIG. 10 is an end view of a thrust and distributor plate;

FIG. 11 is a cross-sectional view taken along the line XI—XI in FIG. 10;

FIG. 12 is an end view of the back pressure plate; and

FIG. 13 is a cross-sectional view taken along the line XIII—XIII in FIG. 12.

SUMMARY OF THE INVENTION

The apparatus of the present invention is characterized primarily in that as the outer housing for the stack of filter elements, a pipe is provided which is open at both ends, and the inner diameter of which is the same as, or less than, the diameter of the stack. The pressure plates, which clamp the stack together, include at the outer periphery annular grooves, the essentially radially extending sidewalls of which diverge toward the ends of the pipe in order to press sealing rings, which are disposed in the grooves, radially and axially toward the outside against the inner wall of the pipe in the case of excess inner pressure.

The inventive filter apparatus is particularly easy to disassemble and reassemble by loosening the clamping bolt connection. In the pressureless state, the entire stack of filter elements can be withdrawn from the pipe. During reassembly in the reverse direction, the pressure generated in the interior of the filter apparatus assures that the annular seals present in the pressure plates are pressed radially outwardly, with the sealing pressure becoming greater as the inner apparatus housing pressure, which is to be protected, becomes greater.

Pursuant to specific embodiments of the present invention, the central clamping bolt, between the pressure plates, is provided in its surface with concentrically disposed grooves which form a permeate or filtrate outlet; these grooves are connected with a filtrate discharge line outside the filter stack. The outlet grooves may be provided with a cross-sectional area which constantly increases between the feed end and the discharge end of the stack of filter elements.

A plurality of separate filtrate outlet grooves may be provided on the surface of the clamping bolt. These grooves may extend, in a uniform progression, from the discharge end of the stack of filter elements in various distances in the direction toward the feed end of the stack of filter elements. The feed or inlet connection and the discharge or outlet connection may be provided in the same pressure plate. A cylindrical gap may be provided between the outer periphery of the stack of filter elements and the inner wall of the pipe housing in order to connect one of the connections provided in the pressure plate with the remote end of the filter element stack. To seal the outside of the stack of filter elements relative to the cylindrical gap, the outer edges of the membranes are glued or joined with their carrier plates in the filter elements.

The filter elements are provided with axially disposed openings or passages and with seals which are alternately disposed on the inner and outer peripheries, and are connected together in such a way that the membranes of the filter elements alternately have media flowing therethrough in the radial direction from the inside toward the outside and then from the outside toward the inside.

DESCRIPTION OF PREFERRED EMBODIMENTS

Figure 1:
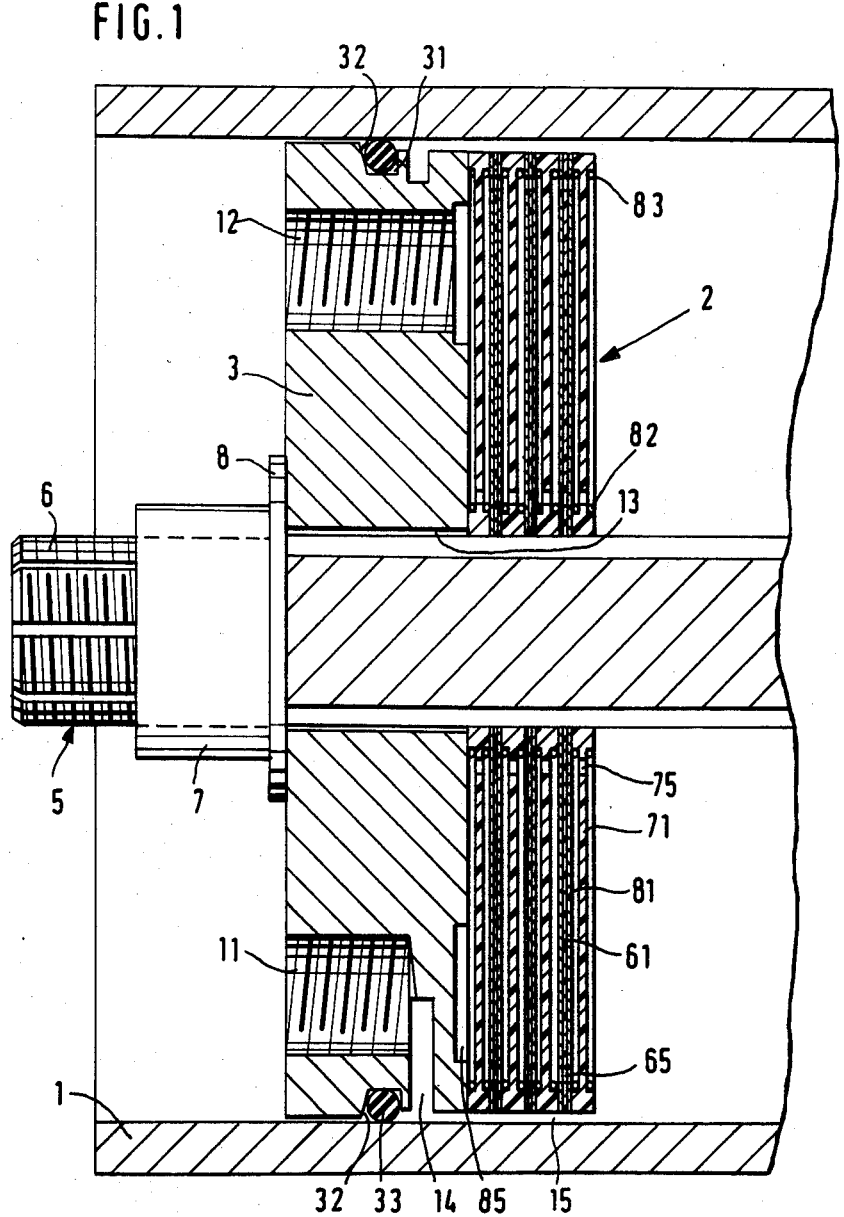
FIG. 1 is a partial axial sectional view through the front end of one embodiment of an inventive device for salt water conversion by reverse osmosis.
Figures 2, 3:
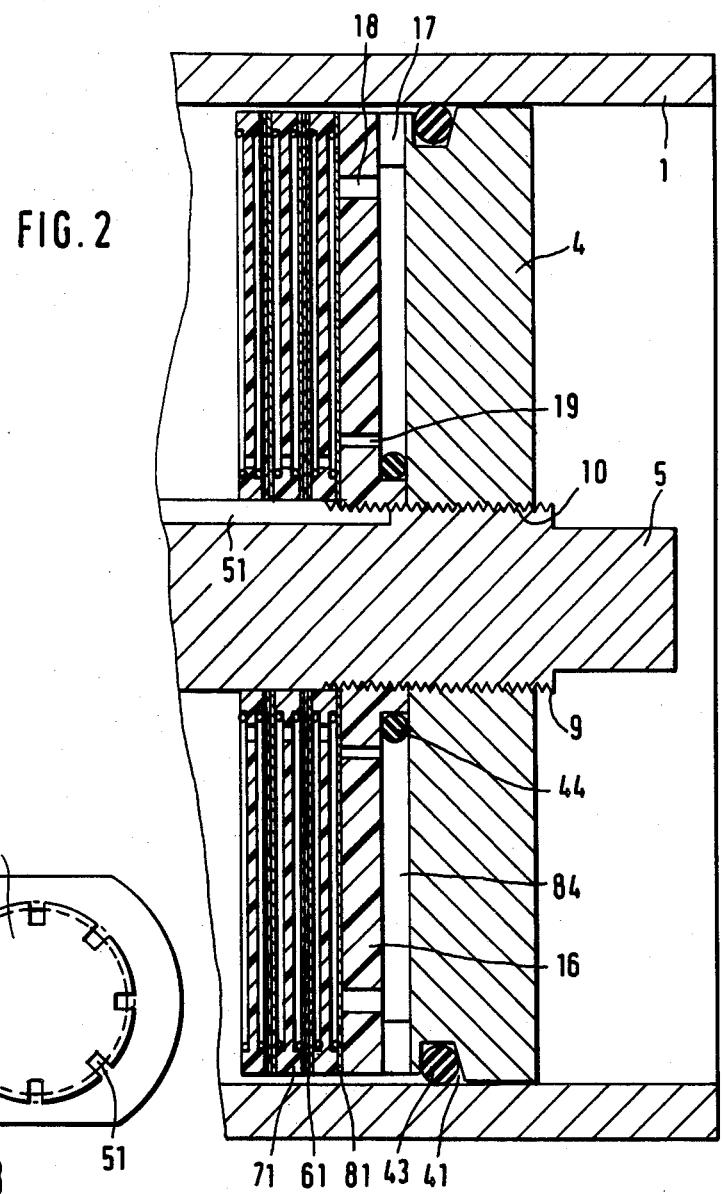
FIG. 2 is a view that shows the back end of the apparatus illustrated in FIG. 1, with the individual parts of the apparatus being illustrated to a smaller scale in FIGS. 4 to 12.
FIG. 3 is a view that shows the screw connection of the central clamping bolt.

Referring now to the drawings in detail, the inventive apparatus for filtering and separating flowing media is illustrated in FIGS. 1 and 2 approximately in a normal size. This apparatus as an outer housing thereof utilizes a pipe 1 which is open at both ends and which can, for example, be approximately one meter long. Disposed in this housing pipe 1 there is a stack 2 of filter elements, the individual components of which will be described in detail subsequently. This stack 2 of filter elements is disposed within the pipe 1 between a front pressure plate 3 and a back pressure plate 4. A central clamping bolt 5 extends over the entire length of the apparatus. An external thread 9 of the clamping bolt 5 is inserted into the threaded hole 10 of the back pressure plate 4. The bolt 5 passes through all of the components of the filter element stack, as well as through a central hole 13 of the front pressure plate 3. The stack 2 is clamped together by having the front pressure plate 3 stressed via a nut 7 which is screwed onto the external thread 6 of the bolt 5, and via a washer 8.

All of the connections of the apparatus are located in the front pressure plate 3. These connections include a feed or inlet connection 11 for untreated water, a discharge or outlet connection 12 for brine, and a permeate or filtrate outlet. The filtrate leaves the apparatus, in a manner which will be described in detail subsequently, via channels formed by concentrically disposed grooves 51 between the central hole 13 of the front pressure plate 3 and the clamping bolt 5 (see FIG. 3).

The inlet connection 11 can be a threaded hole, as indicated in FIG. 1. This concentrically disposed threaded hole 11 communicates with an annular groove 14 which is provided at the outer periphery of the pressure plate 3. Downstream of the annular groove 14, when viewed in the direction of flow, the pressure plate 3 has a reduced diameter which essentially corresponds to the outer diameter of the stack 2 of filter elements; this diameter is somewhat less than the inner diameter of the pipe 1. In this manner, the untreated water supplied at the inlet 11 can reach the back end of the apparatus (illustrated in FIG. 2) via a cylindrical gap 15 which surrounds the entire stack 2 of filter elements.

At the back end of the apparatus, ahead of the back pressure plate 4, there is disposed a thrust or distributor plate 16, which has a central hole 21, as illustrated in FIGS. 10 and 11. This plate 16, which has a dish-shaped construction and rests against the pressure plate 4, is provided with radially directed bores 17 and concentrically disposed bores 18. In this manner, the untreated water, which arrives via the cylindrical gap 15, can be distributed over the back end face of the stack of filter elements in order to then successively flow through the individual filter elements of the stack. A gasket 44 disposed between the distributor plate 16 and the pressure plate 4 prevents the inflowing untreated water from arriving at the outer surface of the clamping bolt 5, since the filtrate is supposed to be withdrawn in this region.

The individual filter elements of the stack 2 respectively comprise a carrier plate 61, a guide plate 71, and membranes 81 disposed between the two plates 61 and 71.

Successively arranged in the stack of elements are a guide plate 71, a membrane 81, a carrier plate 61, a membrane 81, a guide plate 71, a membrane 81, etc. As shown in FIGS. 6 and 7, the thin-walled guide plate 71 comprises an annular disk which, in the vicinity of its central hole 74, is provided with an annular flange or collar 73, and which on its outer periphery, is provided with an annular flange or collar 72. A series of axially disposed passages 74 can be disposed in the guide plate 71 in the vicinity of the central hole 74 thereof.

The carrier plate 61 illustrated in FIGS. 8 and 9 is also very thin-walled. The carrier plate 61 is provided on its outer periphery with a series of axially disposed passages 65, and has a central hole 64 which, just like the central hole 74 of the guide plate 71, can rest against the outer periphery of the clamping bolt 5. Both sides of the carrier plates 61 are covered with a membrane 81. In order for the filtrate which passes through the membrane to be able to more easily find its way to the filtrate outlet, a thin fabric layer can be disposed between the surface of a carrier plate 61 and the surface of a membrane 81. The periphery of the membrane is preferably glued to the periphery of the carrier plate 61 outwardly of the axially disposed passages 65, so that here a sealed connection results in conjunction with the annular collar 72 of the guide plate 71. Instead of being circular, the central hole 64 of the carrier plate 61 contains enlarged portions 63 via which the permeate or filtrate, that is separated between the membrane and the carrier plate, can reach the filtrate outlet grooves 51 of the clamping bolt 5.

Media flows through the stack of filter elements as follows:

Untreated water which is guided via the cylindrical gap 15 to the right end of the filter apparatus arrives, at via the radial bores 17 of the distributor plate 16, the annular chamber 84 between the back pressure plate 4 and the distributor plate 16. Via the axially disposed bores 18 and 19, the untreated water contacts a large surface area of the membrane located on the facing side of the distributor plate 16. Since a seal exists at the outer periphery, the filtrate passing through the membrane 81 can only be conveyed to the middle, i.e. to the periphery of the clamping bolt 5. On the surface of the clamping bolt 5, the filtrate is guided via the filtrate outlet grooves 51 to the left end of the apparatus (FIG. 1), where the filtrate can exit along the end face of the bolt 5 and can be collected outside the apparatus. The untreated water separated as a result of the loss of filtrate then flows from the right end of the apparatus to the left end, flowing radially outwardly after passing through the passages 75 of the guide plate 71, and radially inwardly after passing through the axially disposed bores or passages 65 of the separating or carrier plate, until after the guide plate 71 the annular chamber 85 is reached which communicates with the outlet connection 12.

Since the filtrate which accumulates at the periphery of the clamping bolt 5 continuously increases, while the untreated water flows through the apparatus from right to left in FIGS. 1 and 2, withdrawal channels are required which continuously increase. For this purpose, the four pairs of filtrate outlet grooves 51 illustrated in FIG. 3 do not all lead to the right back end of the bolt 5. For example, there is conceivable that one of the pairs of grooves 51 extends over the entire effective length of the bolt 5, while the other pairs of the grooves 51 extend over either 75%, 50%, or 25% of the effective length of the bolt 5. Another possibility is to provide a single filtrate withdrawal channel, the cross-sectional area of which constantly increases from the right and toward the left end. The use of several pairs of filtrate withdrawal grooves which extend over different lengths of the modular unit leads to the advantage that the possibility is thereby given to localize the areas of malfunction. If pure filtrate is encountered at one of the filtrate withdrawal grooves, then there follows that no problem exists in a corresponding region of the modular unit over which this groove extends. On the other hand, if a lack of sealing relative to the conveyance of the untreated water exists in the region of the modular unit over which this groove extends, contamination of the filtrate with untreated water will always appear at the individual groove.

The sealing arrangement between the membrane units and the clamping bolt, i.e. to the filtrate withdrawal channel, is effected by interposed O-rings. A sealing arrangement at the outer periphery relative to the in-flowing untreated water in the cylindrical gap 15 and to the untreated water or brine channels between the membrane units also could be provided. However, this is generally not necessary if the membranes are glued to the supporting plates. At the outer end of the modular unit (to the right in FIG. 2), differential pressures of up to, for example, 5 bar can occur. If a leak actually occurs here, the result is that a portion of the untreated water which has not yet been processed passes into the highly concentrated brine and thus escapes. However, the ability of the modular unit to function is not adversely affected. Practically no pressure differentials are produced at the inner end of the modular unit (to the left in FIG. 1).

The modular unit or filtration apparatus described above primarily can be manufactured in an extremely economical manner because it is held together by a single clamping bolt 5 and threaded nut 7. This threaded connection between the pressure plates 3 and 4 and the clamping bolt 5 in conjunction with the pressure which exists within the apparatus during operation, furthermore assures a trouble free sealing of the housing that becomes better and more reliable as the pressure within the housing increases. As shown in FIGS. 1 and 2, disposed along the periphery of the pressure plates 3 and 4 there are annular grooves 31 and 41 in which are placed gaskets in the form of O-rings 33 and 43. The unique thing about this peripheral sealing arrangement is that those sides of the annular grooves 31 and 41 toward the opening of the pipe are provided with sidewalls 32 or 42 which diverge toward the outside. As a result of these inclined sidewalls 32 and 42, when pressure exists within the filter apparatus, the sealing rings 33 and 43 not only are pressed axially outwardly, but also are expanded radially. The sealing rings 33 and 43 therefore are disposed in the acute-angled space which results between the inner wall of the pipe 1 and the inclined groove sidewall 32 or 42.

Thus, there is inventively provided in the least amount of space an extremely reliable modular unit, the filter elements of which can be disassembled by loosening a single threaded nut, and the housing of which in a particularly economical manner comprises a standard pressure-resistant pipe which is open at both ends, with a reliable seal being achieved with very simple means.

If, as an example, a modular unit having a length of 1 m and an inner diameter of 20 cm is constructed, then, depending upon the thickness of the membrane elements, which ranges between 2 and 4 mm, 200 to 400 plates can be accommodated having an overall effective surface of 5 $m^2$ or more.

The present invention is, of course, in no way restricted to the specific disclosure of the specification and drawings, but also encompasses any modifications within the scope of the appended claims.

What we claim is:

1. In an apparatus for filtering and separating flowing media; said apparatus including a plurality of circular, disk-like filter elements which are connected in series as arranged in a stack having an inner periphery and are stacked against one another; each filter element including a plate-like carrier plate, a dish-shaped guide plate, and a membrane which is disposed between each carrier plate and guide plate and is covered with a filtering layer; said stack of filter elements having two ends, at each of which there is provided a wheel-shaped pressure plate; said pressure plates serving to clamp together the stack of filter elements via a clamping bolt along which permeate passes and which extends through the central holes of said filter elements; the improvement in combination therewith which comprises:

a pipe which serves as an outer extraordinarily pressure-resistant housing for said stack of filter elements removable in axial direction as an entire module block accessible for service and repair purposes, said pipe being open at both ends thereof; the inner diameter of said pipe being approximately the same as the diameter of said filter element stack; the outer periphery of each of said pressure plates being provided with annular grooves, each of which has at least one essentially radially extending side wall which diverges via an inclined surface toward one of the open ends of said pipe; and respective sealing rings disposed in said annular grooves so that accordingly upon encountering an excessive internal pressure, said side walls effect a secure closing by tight pressing of said sealing rings shiftable and slidable both radially and also axially outwardly along said inclined surface for reinforced sealing under pressure peripherally against the inner wall of said pipe although permeate is discharged along inner periphery of said stack which means along said clamping bolt rather than having peripherally outer discharge thereof and consequently individual plates are subjected accordingly only to differential pressures amounting to less bar of pressure;

said clamping bolt, which is centrally disposed through said filter elements, having in its outer surface, between said pressure plates, concentrically disposed filtrate outlet grooves which are adapted to communicate with a filtrate discharge line externally of said stack of filter elements;

both an inlet connection and an outlet connection in one of said pressure plates; and means that form a cylindrical annular gap between the outer periphery of said filter element stack and the inner wall of said pipe in order to provide communication between one of said connections and that end of said stack of filter elements remote from said pressure plate which includes said inlet and outlet connections; the radially outer edges of said membranes being joined with the adjacent carrier plates in order to seal the radially outer portion of said filter element stack relative to said cylindrical gap; said filter elements being provided with axially disposed passages, and with seals which are alternately disposed on the inner and outer peripheries of said filter elements; said filter elements being connected together in such a way that when viewed in the radial direction, medium alternately flows over said membranes thereof from the inside to the outside, and from the outside to the inside.

2. An apparatus in combination according to claim 1, with the cross-sectional area of said filtrate outlet grooves of said clamping bolt increasing constantly from one end of said filter element stack to the other end of said filter element stack.

3. An apparatus in combination according to claim 1, with said filtrate outlet grooves, in a uniform progression, extending different distances from one end of said filter element stack to the other end of said filter element stack.

* * * * *